(No Model.)
G. W. PAIGE.
VEGETABLE FORK.
No. 557,016. Patented Mar. 24, 1896.
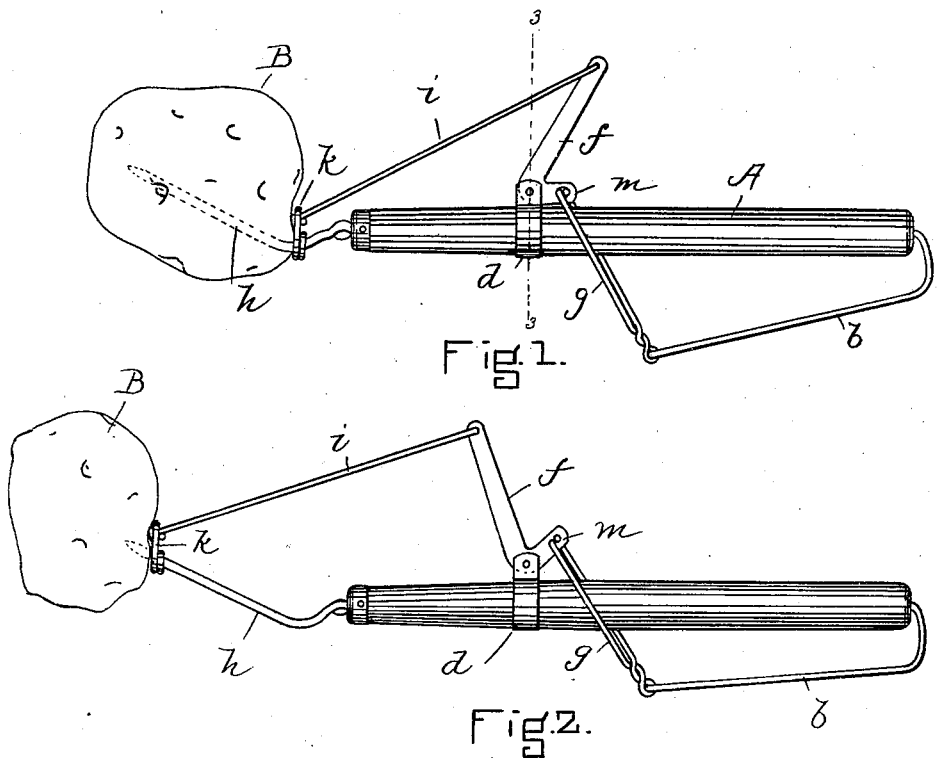
Fig. 1.
Fig. 2.
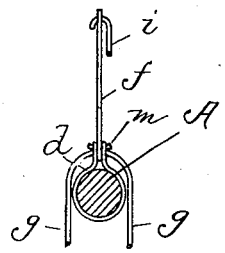
Fig. 3.
WITNESSES.
Matthew M. Blunt
C. M. Wilbur
INVENTOR.
George W. Paige
By O. M. Shaw
ATT'Y

UNITED STATES PATENT OFFICE.

GEORGE W. PAIGE, OF HOPKINTON, NEW HAMPSHIRE, ASSIGNOR TO SAM. K. PAIGE, OF SAME PLACE, AND KIRK D. PIERCE, OF HILLSBOROUGH, NEW HAMPSHIRE.

VEGETABLE-FORK.

SPECIFICATION forming part of Letters Patent No. 557,016, dated March 24, 1896.

Application filed October 7, 1895. Serial No. 564,853. (No model.)

*To all whom it may concern:*

Be it known that I, GEORGE W. PAIGE, of Hopkinton, in the county of Merrimac, State of New Hampshire, have made certain new and useful Improvements in Vegetable-Forks, of which the following is a description sufficiently full, clear, and exact to enable any person skilled in the art or science to which said invention appertains to make and use the same, reference being had to the accompanying drawings, forming part of this specification, in which—

Figure 1 is a side elevation of my improved fork represented as in use; Fig. 2, a like view with the follower projected, and Fig. 3 a section on line 3 3 in Fig. 1.

Like letters of reference indicate corresponding parts in the different figures of the drawings.

My invention relates especially to a device attachable to that class of forks which are employed in handling cooking vegetables, whereby the vegetable may be removed from the tines without engaging directly with the hands of the operator and thereby avoiding the danger of burning the hands or breaking the vegetable.

The nature and operation of the invention will be understood by those conversant with such matters from the following explanation.

In the drawings, A represents the wooden handle of forks of this class which are ordinarily provided with two tines $h$. In the end of the handle one end of a spring-wire $b$ is secured in such manner that said handle and wire can be compressed together. A sliding collar $d$ is mounted on the handle, and in ears thereon a bell-crank lever $f$ is pivoted to swing vertically. A forked lever $g$ astriding the handle connects the short arm of the bell-crank with the free end of the spring-rod. On the tines $h$ a follower $k$ is fitted to slide, and a rod $i$ pivotally connects said follower with the long arm of the bell-crank.

In the use of my improvement, the parts being in the position shown in Fig. 1, with the follower $k$ retracted, the tines $h$ are free to penetrate the vegetable B, leaving the fork to be manipulated in the usual manner. The operator, by compressing the spring-rod $b$, causes the rod $g$ to move vertically upward and throw the long arm of the bell-crank forward. This drives the follower $k$ against the vegetable and pushes it from off the tines, as shown in Fig. 2. When the spring-bar $b$ is released it immediately throws downward and retracts the follower in a manner obvious without further explanation.

I am aware that it is not new to apply a sliding follower to the tines of a fork and retract the same by a spring, and hence do not claim the same broadly.

Having thus explained my invention, what I claim is—

The fork provided with the wooden handle in combination with the spring, $b$, secured thereto: the bell-crank lever pivotally mounted on said handle as described: the forked lever pivotally connecting one arm of the bell-crank lever with said spring: the rod, $i$, connected with the companion bell-crank-lever arm: and the follower fitted to slide on the fork-tines and pivoted to said rod all being arranged to operate as specified.

GEORGE W. PAIGE.

Witnesses:
SAM K. PAIGE,
D. D. SPALDING.